(12) United States Patent
Zou (10) Patent No.: US 6,275,865 B1
(45) Date of Patent: Aug. 14, 2001

(54) METHOD AND SYSTEM FOR MESSAGE DISPATCHING IN A HOME AUDIO/VIDEO NETWORK

(75) Inventor: Feng Zou, Milpitas, CA (US)

(73) Assignees: Sony Corporation of Japan, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/199,973

(22) Filed: Nov. 25, 1998

(51) Int. Cl.$^7$ ....................................................... G06F 9/00

(52) U.S. Cl. ............................................ 709/313; 709/245

(58) Field of Search ............................... 725/78; 709/312, 709/313, 314, 315, 316, 317, 318, 245

(56) References Cited

U.S. PATENT DOCUMENTS

| | | | |
|---|---|---|---|
| 4,893,199 | 1/1990 | Okada | 360/48 |
| 5,420,573 | 5/1995 | Tanaka et al. | 340/825.24 |
| 5,537,605 | 7/1996 | Teece | 395/800 |
| 5,603,059 | * 2/1997 | Churchill et al. | 710/36 |
| 6,085,236 | * 7/2000 | Lea | 709/220 |
| 6,173,337 | * 1/2001 | Akhond et al. | 709/318 |
| 6,198,479 | * 3/2001 | Humpleman et al. | 345/329 |
| 6,202,147 | * 3/2001 | Slaughter et al. | 713/1 |

FOREIGN PATENT DOCUMENTS

| | | | |
|---|---|---|---|
| 2767795 | 3/1989 | (JP) | H04L/13/00 |

OTHER PUBLICATIONS

Sony et al., Specification of the Home Audio/Video Interoperability (HAVi) Architecture, May 11, 1998.
Sony et al., Specification of the Home Audio/Video Interoperability (HAVi) Architecture, Nov. 19, 1998.

* cited by examiner

Primary Examiner—Dung C. Dinh
Assistant Examiner—Bradley Edelman
(74) Attorney, Agent, or Firm—Wagner, Murabito & Hao LLP (57) ABSTRACT

A method of routing a received message to a proper software controller in a home audio/video network of connected network devices. A message is received from a network bus by an intelligent device coupled to the network bus, wherein the intelligent device includes a memory having stored therein a plurality of software controllers for communicating with a plurality of network devices. The intelligent device examines the received message to determine a memory space indication and a source device identification stored therein. The intelligent device then determines whether any software controllers associated with the device match the memory space indication. Provided that only one software controller matches the memory space indication, the received message is dispatched to the one software controller. Provided that more than one software controller matches the memory space indication, the received message is dispatched to that software controller that is also associated with the source device identification of the received message. Provided the memory space indication matches a self-software controller defined to control the intelligent device and another software controller, the received message is dispatched to the another software controller provided the another software controller is awaiting a return message. The received message is otherwise dispatched to the self-software controller. Once received by the proper software controller, the received message is dispatched as required to one or more sub-software controllers included therein.

24 Claims, 9 Drawing Sheets

METHOD AND SYSTEM FOR MESSAGE DISPATCHING IN A HOME AUDIO/VIDEO NETWORK

FIELD OF THE INVENTION

The field of the present invention pertains to audio-video systems. More particularly, the present invention pertains to implementing standardized software based message dispatching system for devices coupled in a home audio/video network.

BACKGROUND OF THE INVENTION

A typical home audio/video equipment set up includes a number of components. For example, a radio receiver, a CD player, a pair of speakers, a television, a VCR, a tape deck, and alike. Each of these components are connected to each other via a set of wires. One component is usually the central component of the home audio/video system. This is usually the radio receiver, or the tuner. The tuner has a number of specific inputs for coupling the other components. The tuner has a corresponding number of control buttons or control switches which provide a limited degree of controllability and interoperability for the components. The control buttons and control switches are usually located on the front of the tuner. In many cases, some, or all, of these buttons and switches are duplicated on a hand held remote control unit. A user controls the home audio/video system by manipulating the buttons and switches on the front of the tuner, or alternatively, manipulating buttons on the hand held remote control unit.

This conventional home audio/video system paradigm has become quite popular. As consumer electronic devices become more capable and more complex, the demand for the latest and most capable devices has increased. As new devices emerge and become popular, the devices are purchased by consumers and "plugged" into their home audio/video systems. Generally, the latest and most sophisticated of these devices are quite expensive (e.g., digital audio tape recorders, DVD players, digital camcorders, and alike). As a consumer purchases new devices, most often, the new device is simply plugged into the system alongside the pre-existing, older devices (e.g., cassette tape deck, CD player, and the like). The new device is plugged into an open input on the back of the tuner, or some other device couple to the tuner. The consumer (e.g., the user) controls the new device via the control buttons on the tuner, via the control buttons and control switches on the front of the new device itself, or via an entirely new, separate, respective remote control unit for the new device.

As the number of new consumer electronics devices for the home audio/video system have grown and as the sophistication and capabilities of these devices have increased, a number of problems with the conventional paradigm have emerged. One such problem is incompatibility between devices in the home audio/video system. Consumer electronic devices from one manufacturer often couple to an audio/video system in a different manner than similar devices from another manufacturer. For example, a tuner made by one manufacturer may not properly couple with a television made by another manufacturer. Within conventional home audio/video systems, there is not a standardized way of coupling devices such that they interact predictably and reliably. This is especially true in the case of coupling devices from different manufacturers.

Another problem is the lack of standardized methods of enabling and facilitating communication between the devices coupled within the home audio/video system. For example, different devices often include their own unique formats for enabling communication with other devices. Devices from different manufacturers often use different formats for communication. For example, a VCR from one manufacturer is often unable to communicate with the television from another manufacturer. In the past, there existed no standardized method for interconnecting various devices into a seamless home audio/video network.

The emergence of networking and interface technology (e.g., IEEE 1394 serial communication bus and the wide spread adoption of digital systems) offers prospects for correcting these problems. The dynamic capability of 1394 makes it an idea physical media for interconnecting audio/video devices in a home network. The IEEE 1394 technology provides an architecture capable of offering a flexible distributed peer-to-peer software framework that consumer electronics companies can use to develop home audio/video devices and applications/features for those devices that were not feasible previously. Such applications/features include true plug-and-play, fully automated device self-configuration, and the like.

While the emergence of powerful networking and interface technology (e.g., IEEE 1394 serial communication bus and the wide spread adoption of digital systems) offers prospects for correcting the above problems, there is still no coherent, open, extensible architecture which can provide for a standardized, intelligent, self configuring, easily extensible architecture which facilitates the efficient transmission and reception of data messages between various components/devices of the home audio/video network.

There is no standardized architecture for ensuring reliable, efficient communication between the various software and hardware components within the home audio/video network. For example, while various home audio/video network solutions involve the use of IEEE 1394 as the basic transport layer of a network communications system, none provide a system for ensuring the seamless transmission and reception of data messages between the various software/hardware components within the home audio/video network, especially in those cases where the various software components may be distributed among different hardware platforms (e.g., devices) coupled to the home audio/video network.

SUMMARY OF THE INVENTION

Accordingly, the present invention provides a novel method and system that implements a standardized, intelligent, self configuring, easily extensible architecture operable to ensure the efficient transmission and reception of data messages between various components/devices of a home audio/video network. The present invention provides a standardized architecture for ensuring reliable, efficient communication between the various software and hardware components within the home audio/video network and ensures the seamless transmission and reception of data messages between software/hardware components. In addition, the present invention ensures the seamless transmission and reception of data messages in implementations where the various software components may be distributed among different hardware platforms coupled to the home audio/video network.

In one embodiment, the present invention is implemented as a software based architecture that routes received messages to a proper software controller resident in a home audio/video network of connected network devices. The software component that ensures the proper routing is referred to as the communications media manager (CMM). The CMM functions as a gateway for sending and receiving messages to and from various network devices in a HAVI (home audio/video interoperability) network. More specifically, the present invention provides an effective dispatching mechanism for properly routing received messages to a software controller among a plurality of software controllers resident on a network device.

The CMM executes on an embedded computer system within an intelligent device (e.g., a set-top box) coupled to the HAVI network. The computer system of the intelligent device also hosts several software based controllers, referred to as device control modules (DCMs) and function control modules (FCMs), that provide a software based abstraction of the various devices coupled to the HAVI network. The software controllers communicate with their respective devices on the network via a message passing system. The CMM ensures messages are routed to the proper devices and software controllers.

In operation, when a message is received from the HAVI network by the CMM, the CMM examines the received message to determine a memory space indication and a source device identification stored therein. The CMM then determines whether any software controllers associated with the device match the memory space indication. Provided that only one software controller matches the memory space indication, the received message is dispatched to the one software controller. Provided that more than one software controller matches the memory space indication, the received message is dispatched to that software controller that is also associated with the source device identification of the received message. In the case of a conflict between a particular DCM and the host device's Self-DCM, the Self-DCM takes priority. In so doing, CMM and its communications architecture ensures reliable, efficient communication between the various software and hardware components within the HAVI network, and ensures seamless transmission and reception of datamessages there between.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Accordingly, the present invention provides a novel method and system that implements a standardized, intelligent, self configuring, easily extensible architecture operable to ensure the efficient transmission and reception of data messages between various components/devices of a home audio/video network. The present invention provides a standardized architecture for ensuring reliable, efficient communication between the various software and hardware components within the home audio/video network, and ensures the seamless transmission and reception of data messages between software/hardware components. In addition, the present invention ensures the seamless transmission and reception of data messages in implementations where the various software components may be distributed among different hardware platforms coupled to the home audio/video network. The method and system of the present invention, its operation within the context of the HAVI architecture, and its benefits are described in the discussions which follow.

Notation and Nomenclature

Figure 3:
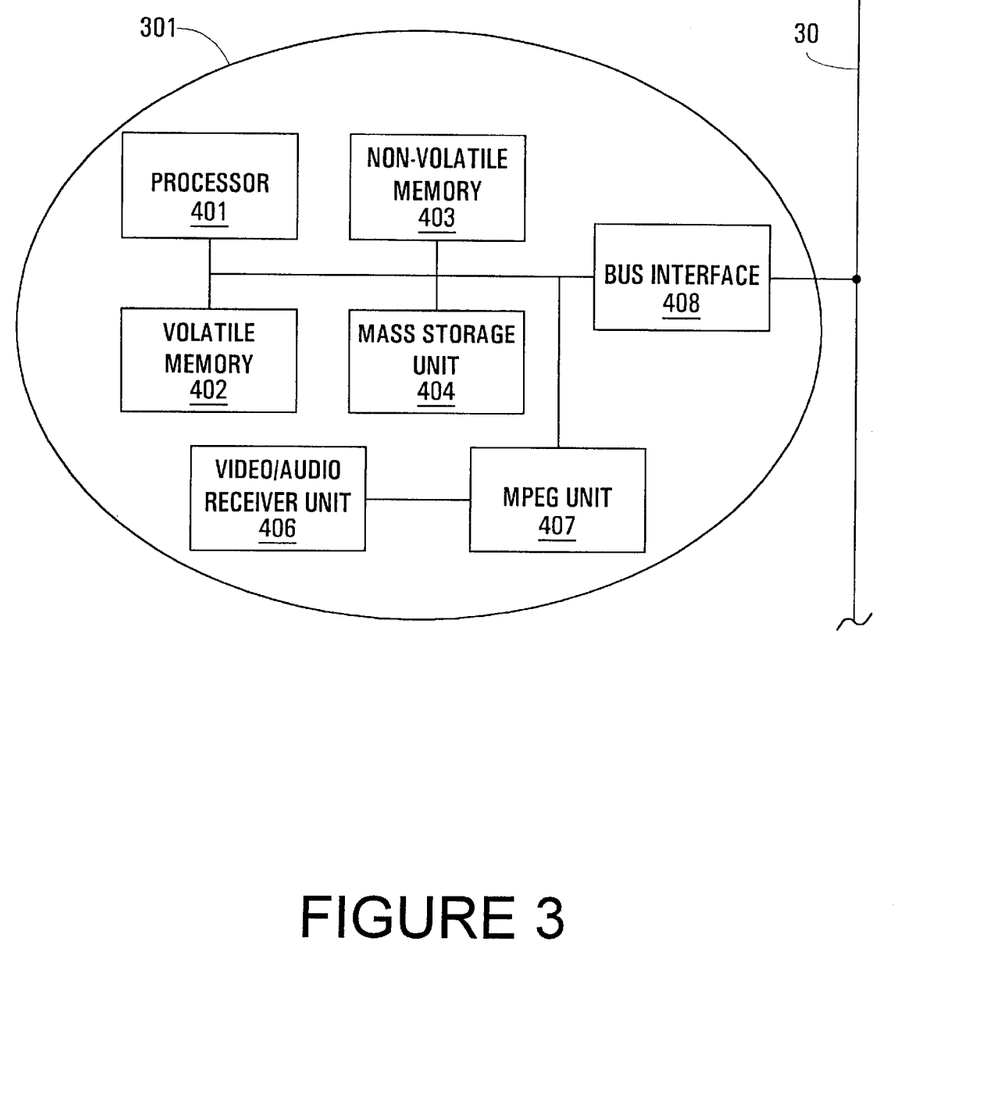
FIG. 3 shows a diagram of a set top box in accordance with one embodiment of the present invention.

Some portions of the detailed descriptions which follow are presented in terms of procedures, steps, logic blocks, processing, and other symbolic representations of operations on data bits within a computer memory (see FIG. 3). These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "instantiating" or "determining" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

HAVI Architecture Overview

The Home Audio/Video Interoperability (HAVI) architecture provides the functional frame work within which the method and system of the present invention operates. HAVI provides for the creation of a Home AV (audio/video) system which provides for seamless support of new devices and problem free communication and interoperability of devices in a home AV network. The most basic components of a HAVI system in accordance with the present invention are: a home AV interoperability architecture, a series of home AV interoperability interfaces, and a home AV network. The home AV interoperability architecture is a broad, over arching term encompassing the physical network and the controlling programming interfaces. Interoperability interfaces is a term used to describe the interactions and interfaces of the components of the AV architecture. In addition to providing a common command set, the interoperability interfaces provide a software architecture which allows new devices to be integrated into the network and provide their services in a seamless manner. The home AV network is the term used to describe the physical network and its topology.

It should be noted that the home AV interoperability (HAVI) architecture of the present invention (e.g., with which the present invention is compliant) is an open, platform-independent, architecturally-neutral network that allows consumer electronics manufacturers and producers to provide inter-operable appliances. It can be implemented on different hardware/software platforms and does not include features that are unique to any one platform. The interoperability interfaces of the HAVI architecture are extensible and can be added to, modified and advanced as market requirements and technology change. They provide the infrastructure to control the routing and processing of isochronous and time-sensitive data (e.g., such as audio and video content).

It should also be noted that while the embodiments which follow and the discussions thereof are often described in the context of an IEEE 1394 based home audio/video network, the HAVI architecture in general, and the present invention specifically, is not limited to implementation with IEEE 1394 technology only. Other types of networking technology can be used to implement the physical communications frame work required by the present invention. Such other types of networking technology include, for example, ethernet, token ring, universal serial bus, etc.

A HAVI Network Implementation

Figure 1A:
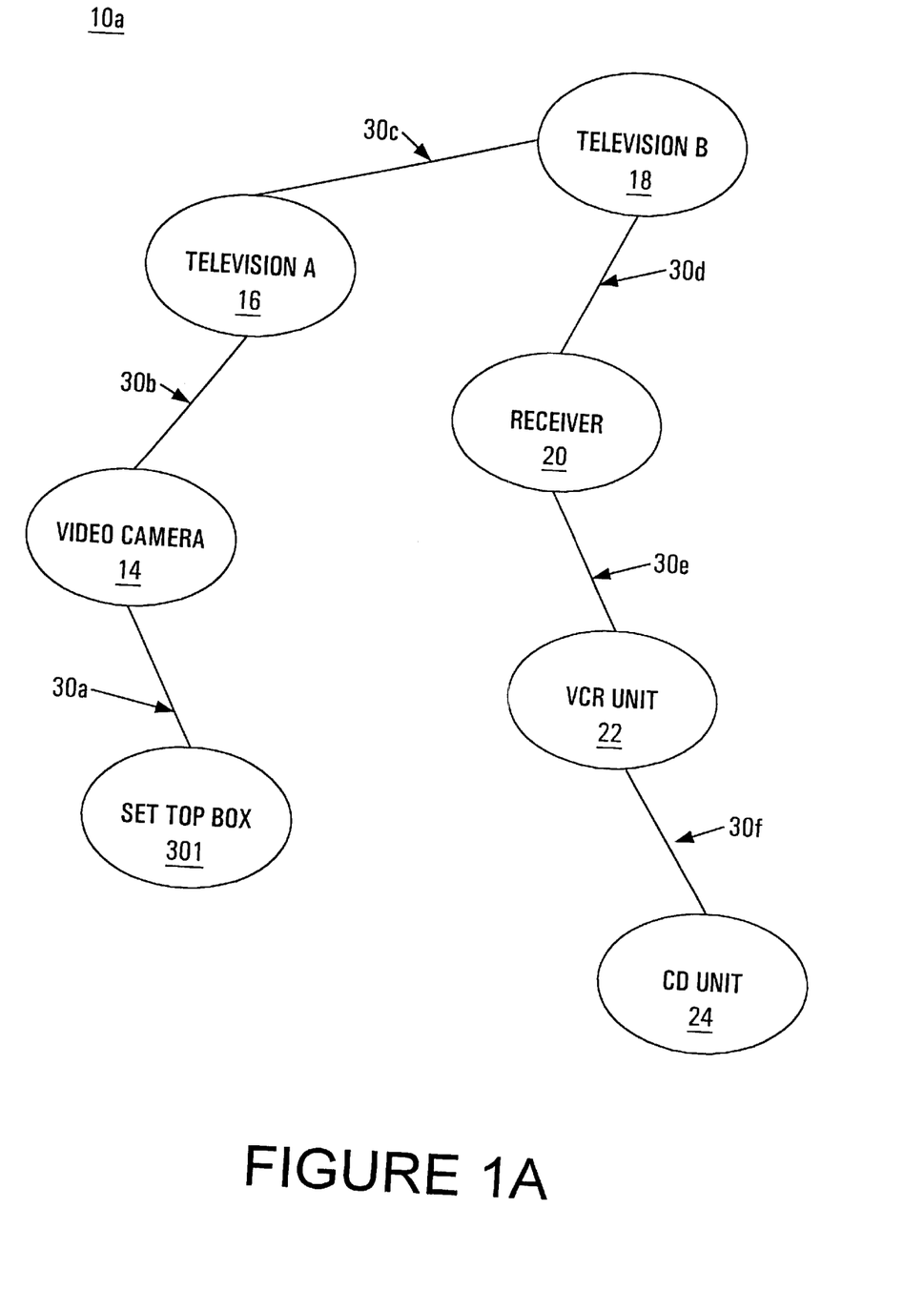
FIG. 1A shows a home AV network in accordance with one embodiment of the present invention.

With reference now to FIG. 1A, a HAVI network 10a in accordance with one embodiment of the present invention is shown. The HAVI architecture supports a wide range of devices including intelligent receiver/decoders (IRDs), for example, the set top box 301, digital video tape records (DVTRs), video cassette recorders (VCRs), personal computers (PCs), digital video disk players (DVDs), etc., communicating via a common messaging system. FIG. 1A illustrates the physical port-to-port connecting configuration 10a of an exemplary HAVI network. CE devices ("devices") 12–24 are shown connected together with bus segments 30a–30f. In one embodiment of HAVI, the IEEE 1394 serial communication bus standard is used as a platform to provide the common messaging system.

Figure 1B:
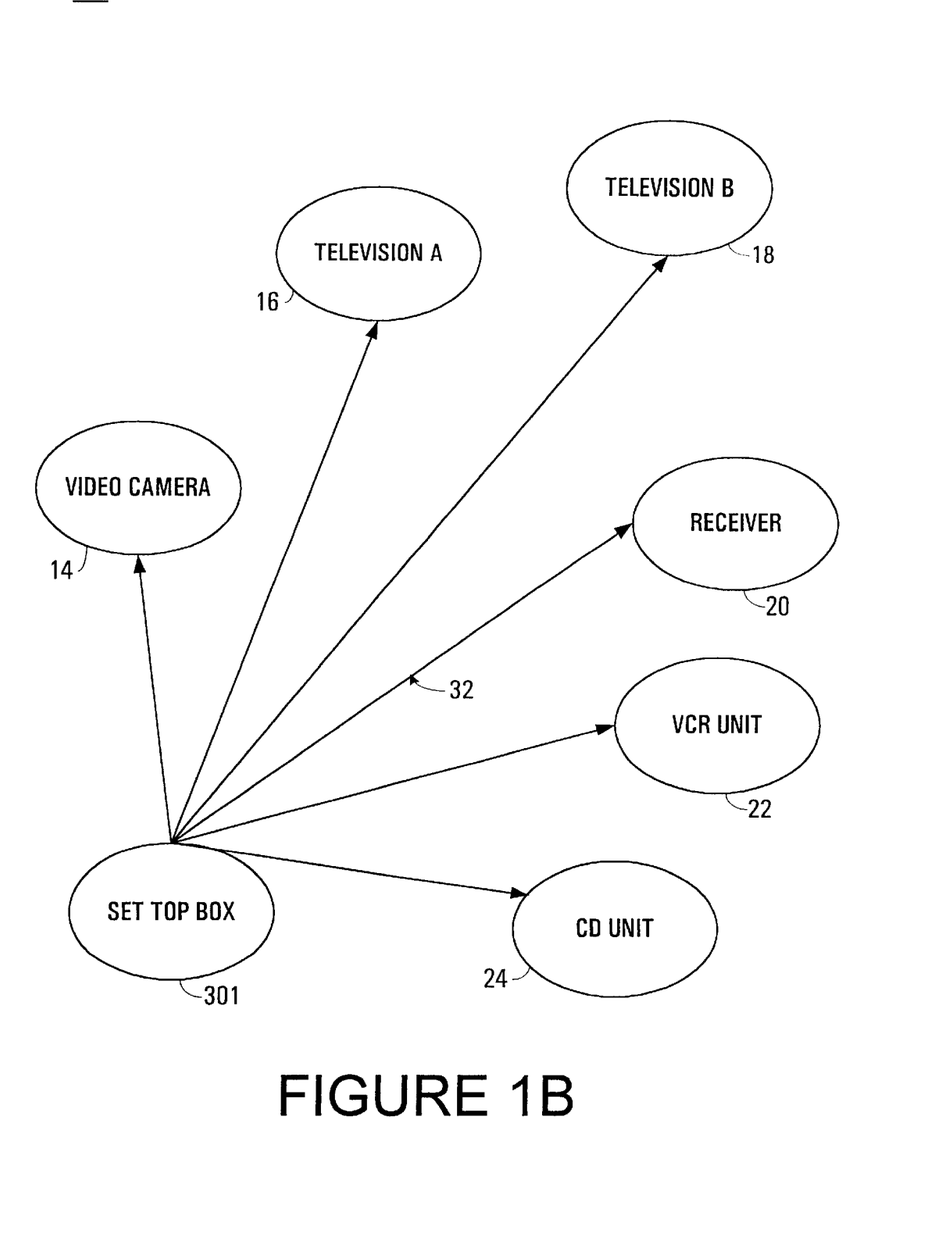
FIG. 1B illustrates a logical bus configuration of the HAVI network of FIG. 1A.

FIG. 1B illustrates a logical bus configuration 10b of the HAVI network of FIG. 1A. As shown in FIG. 1B, all of the devices 12–24 of the HAVI network can be viewed as logically coupled to a common IEEE 1394 serial communication bus 30. Within this bus configuration 10b, peer-topeer device communication is supported. For example, as shown in FIG. 1B, any device (having appropriate capabilities), e.g., device 12, can send or receive communication packets from any other device in the HAVI network. In the example of FIG. 1B, the set-top-box (e.g., an IRD) can receive messages from or generate messages to any of the other devices 14–24 of the HAVI network.

Referring still to FIGS. 1A and 1B, as described above, the interoperability model in HAVI provides for the following: 1) support for existing devices; 2) a default control model; 3) a means to extend the default control model when new devices or functionality is brought to market; and 4) a common means for device representation (e.g., graphics user interfaces). To achieve the above, the HAVI architecture defines three types of nodes in the home network: Full AV nodes (FAV), Intermediate AV nodes (IAV) and Base AV nodes (BAV).

A Full AV node is a device that contains a complete instance of the AV software model. This type of node generally has a richer set of resources and is capable of supporting a complex software environment. The primary distinguishing feature of a FAV is that it is able to take control responsibility for less sophisticated devices and does this by loading a control module, usually from the less sophisticated device, and executing it locally. Examples of such nodes would be Set Top Boxes (e.g., set top box 301), Smart TV's, general purpose home control devices, or even Home PCs.

Intermediate AV nodes are generally lower cost devices that have limited resources. They do not provide an execution environment for control modules and so can not act as master controllers within the home network. Because they have limited resources, they can access remote resources in one of two ways: by working with other IAV devices who provide some capability they lack, or by using an FAV node which supports a control module to control them. In this second mode of operation they rely on full AV nodes to provide such facilities as a display device, general purpose compute resources and some overall control framework. This allows Full AV devices to bind a variety of intermediate AV devices together to provide a service or abstraction to the user.

Base nodes are nodes that are neither FAV or IAV nodes. These are two generic types: Legacy base nodes, and other base nodes. Legacy base nodes are devices that were built before the advent of the HAVI architecture. These devices often use proprietary protocols for their control, and quite frequently have a simple, well defined, control only protocol. Such devices can work in the HAVI network but require that a Full AV node act as a gateway. Communication between a Full or Intermediate AV node and legacy devices requires that the Home AV commands used in the HAVI architecture be translated to and from the legacy command protocol. Other base nodes are devices that, for business or resource reasons, choose to implement future proof behavior using uploadable control software and do not carry any of the HAVI architecture or the message communication system. These devices will be controlled by an FAV node with a private command protocol between FAV and BAV node.

Additional details regarding the implementation and interoperability of the HAVI architecture and the implementation of FAV, IAV, and BAV nodes within the HAVI architecture can be found in U.S. patent application Ser. No. 09/003,119 entitled "A HOME AUDIO/VIDEO NETWORK WITH TWO LEVEL DEVICE CONTROL MODULES", filed on Jan. 6, 1998, now U.S. Pat. No. 6,032,202, U.S. patent application Ser. No. 09/003,097 entitled "HOME AUDIO/VIDEO NETWORK WITH BOTH GENERIC PARAMETERIZED DEVICE CONTROL", filed on Jan. 6, 1998, U.S. Pat. No. 6,052,750 entitled "A HOME AUDIO/VIDEO NETWORK WITH UPDATABLE DEVICE CONTROL MODULES", filed on Jan. 6, 1998, U.S. Pat. No. 6,085,232 entitled "AUDIO/VIDEO NETWORK WITH DEVICE CONTROL MODULES FOR INCORPORATED LEGACY DEVICES", filed on Jan. 6, 1998, U.S. patent application Ser. No. 09/003,412 entitled "METHOD AND SYSTEM FOR DOWNLOADING APPLICATIONS FOR CONTROLLING DEVICES WITHIN A HOME AUDIO/VIDEO NETWORK", filed on Jan. 6, 1998, and U.S. Pat. No. 6,169,725 entitled "APPARATUS AND METHOD FOR RESTORATION OF INTERNAL CONNECTIONS IN A HOME AUDIO/VIDEO SYSTEM", filed on Oct. 30, 1998, which are each incorporated herein by reference.

Figure 2:
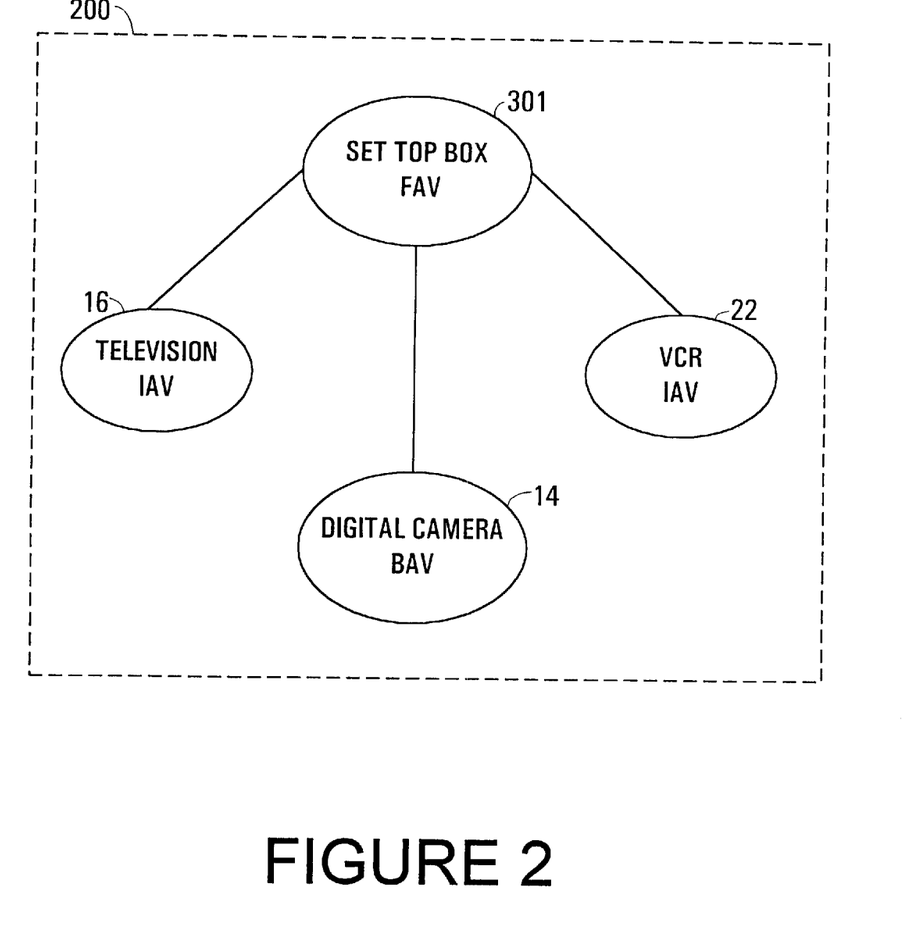
FIG. 2 shows an exemplary FAV node network cluster in accordance with one embodiment of the present invention.

Referring now to FIG. 2, a single FAV cluster 200 in accordance with one embodiment of present invention is shown. HAVI network 200 includes an FAV 301 (e.g., a set top box 301 from FIG. 1A) respectively coupled to a first IAV 16 (e.g., television A 16) a second IAV 22 (e.g., VCR 22) and a BAV 14 (e.g., video camera 14). In HAVI network 200, FAV 301 controls IAV and BAV devices (e.g., devices 16, 14, and 22), providing cluster-wide services.

With reference now to FIG. 3, a diagram of a set top box 301 in accordance with one embodiment of the present invention is shown. As described above, any consumer electronics device can be a FAV and thereby provide a computer system platform for HAVI software. For instance, the set-top-box 301 device of the exemplary HAVI network contains special components that provide an operation platform for software components of the HAVI architecture which are described below. Specifically, aspects of the present invention, described below, are discussed in terms of steps executed on a computer system (e.g., the process shown in FIGS. 7A and 7B). Although a variety of different computer systems can be used with the present invention, an exemplary general purpose computer system is shown in the set-top-box of FIG. 3.

Set-top-box 301 of FIG. 3, in addition to having a video/audio receiver (decoder) unit 406 and MPEG unit 407 also includes an address/data bus 400 for communicating information, one or more central processors 401 coupled with the bus for processing information and instructions, a volatile memory 402 (e.g., random access memory RAM) coupled with the bus 400 for storing information and instructions for the central processor 401 and a non-volatile memory 403 (e.g., read only memory ROM) coupled with the bus 400 for storing static information and instructions for the processor 401. Set-top-box 301 can also optionally include a data storage device 404 ("disk subsystem") such as a magnetic or optical disk and disk drive coupled with the bus 400 for storing information and instructions. Also included in the set-top-box 301 is a bus interface unit 408 for interfacing with bus 30 (e.g., an IEEE 1394 serial bus). Set-top-box 301 can operate under a variety of different operating systems (e.g., Windows operating system, DOS operating system, Macintosh O/S), but in the present embodiment the Aperios operating system can be used.

Figure 4:
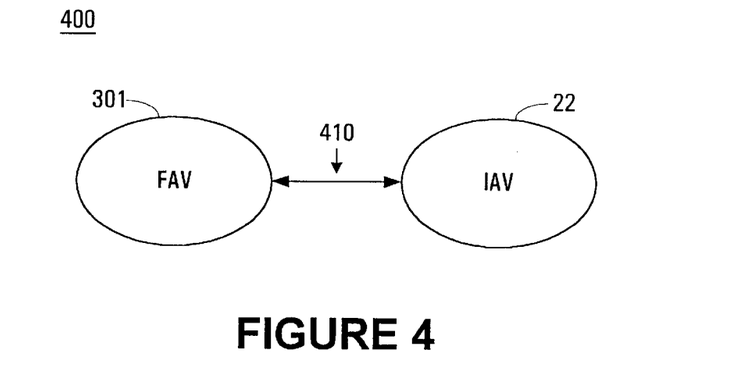
FIG. 4 shows a diagram of an FAV node, an IAV node, and a connection there between in accordance with one embodiment of the present invention.

With reference now to FIG. 4, a diagram 400 showing FAV node 301, IAV node 22, and a connection 410 there between is shown. Within the context of the HAVI specification, FAV nodes (e.g., FAV node 301) function as software managers. FAV node 301 provides a platform for the services that support the HAVI architecture. FAV node 301 provides an execution environment which allows objects to control and communicate with services and devices. To ensure that devices are accessible within the Home AV network, the FAV nodes support a software based abstraction of the services that a device offers to others. This abstraction is referred to as a device control module (DCM). The interface that a DCM exposes to the rest of the system provides the means to access and control that DCM's respective device. In the general case, a FAV will manage a set of DCMs, one for each IAV node and BAV node in the home network or portion of the network that it manages. Thus, it should be appreciated that from a communications and interoperability perspective, one primary role of an FAV node is to manage DCMs and act as an execution environment for DCMs.

With continuing reference to FIG. 4, IAV 22 and FAV 301 communicate by sending messages over the home network using a message passing system. When new devices join the home network, they are recognized and added to a global name database (registry). The registry holds information about their characteristics and provides a reference to a handler for that device. Other devices and services are able to query the registry to locate a device and then using the handler, can interact with the device. For additional descriptions and related art regarding the communication and identification processes of the present invention, the reader is referred to Ogino, et al., entitled "METHOD AND SYSTEM FOR PROVIDING A DEVICE IDENTIFICATION MECHANISM WITHIN A CONSUMER AUDIO/VIDEO NETWORK", a US patent application filed on Jan. 6, 1998, which is incorporated herein by reference.

Figure 5:
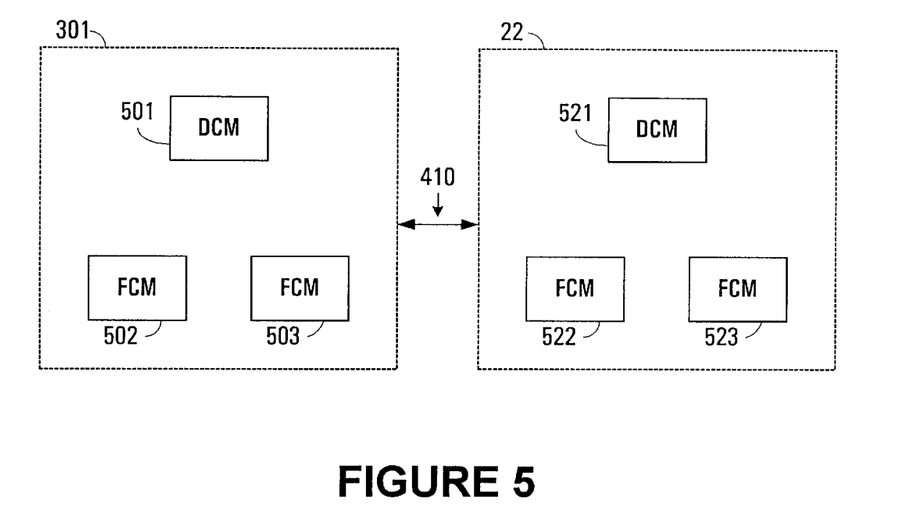
FIG. 5 shows the full AV node and the basic AV node of FIG. 4 with respect to their internal FCMs and DCMs.

Referring now to FIG. 5, FAV node 301 and BAV node 22 are shown with respect to their respective internal DCMs and FCMs. As depicted in FIG. 5, FAV node 301 includes a DCM 501 which further includes an FCM 502 and an FCM 503. BAV node 22 includes a DCM 521 which further includes an FCM 522 and an FCM 523. In accordance with the present invention and in accordance with the HAVI specification, an FCM is a software object providing an interface via which applications invoke related operations provided by the respective device. The DCM functions as a "container" for the various FCMs associated with a particular device. The DCM groups the various FCMs which represent the functional components of the particular device. Typically, FCMs refer to hardware resources within a device. For example, in a case where BAV node 22 is a VCR device, BAV node 22 will include one or more FCMs for its various internal functional components. For example, FCM 522 can be associated with controlling the tuning hardware of the VCR, while FCM 523 is associated with the tape drive mechanism of the VCR. Similarly, in the case where FAV node 301 is a set-top box (e.g., set-top box 301 of FIG. 1A), FCM 502 could be associated with the cable television decoding hardware of the set-top box, while FCM 503 is associated with the remote control unit for the set-top box.

Figure 6:
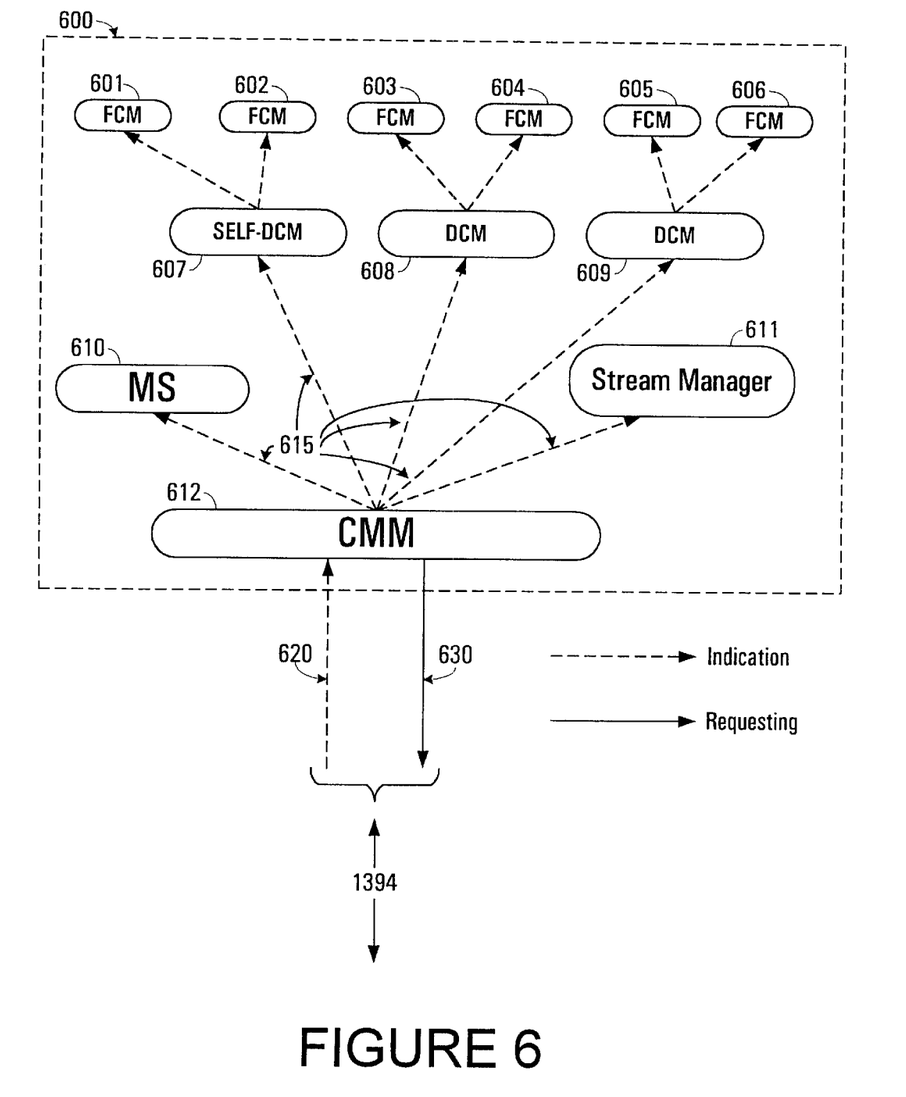
FIG. 6 shows a diagram of the dispatch system implemented by one embodiment of the present invention.

Referring now to FIG. 6, a diagram of a dispatching system 600 in accordance with one embodiment of the present invention is shown. The system 600 includes a plurality of FCMs, FCM 601 through FCM 606. The FCMs 601–606 are coupled as shown to a self DCM 607, a DCM 608, and a DCM 609. DCMs 607–609 are coupled to a CMM (communications media manager) 612. A MS (message system) unit 610 and a stream manager 611 are also coupled to CMM 612. All of the components 601 through 612 are software based components instantiated within the memory of an FAV node (e.g., FAV node 301). In accordance with present invention, CMM (communications media manager) 612 functions as a gateway for sending and receiving the 1394 packets to and from various remote nodes in a HAVI network (e.g., HAVI network 10*a* of FIG. 1A). As described above, a FAV node may have multiple devices associated with it, each being represented by a DCM instantiated within the memory of the FAV node. Each sub-unit, or internal functional component, within a device will be represented by an FCM. The TAM (Transport Adaptation Module) of Message System 610 and an associated Connection Control Module may also sit on top of the CMM 612. Even though the high level communications between HAVI components can be done through MS 610, the actual control commands for a BAV or IAV device are required to go to the CMM 612 directly. The FAV node itself also needs a DCM (e.g., self DCM 607) plus some FCMs (e.g., FCM 601 and FCM 602) to represent itself and its internal sub-units to other devices on the network.

Additionally, it should be noted that, in order to allow a BAV device to partially control a FAV device through some basic AVC or other commands, self DCM 607 of the FAV node needs to provide such support to handle remote indication directly. Thus, CMM 612 may receive indications from various devices in the network. An incoming indication, or message, may target to any component within a FAV or IAV node, as shown by the plurality of dashed lines 615 in FIG. 6. The present invention functions to dispatch the indication to the right component.

As used herein, a request refers to an outgoing message from one of components 601 through 612 to an associated device coupled to the HAVI network. An indication refers to an incoming response from the associated device that results from the request. CMM 612 functions by routing any request received from any of components 601–611 to the network via the 1394 connection. CMM 612 also functions by dispatching the resulting indications returning from a device on the network to the correct one of components 601–611. The outgoing requests are represented in FIG. 6 by line 630. The incoming indications received by CMM 612 are represented by line 620.

Referring still to FIG. 6, indications 620 returning from devices on the HAVI network are received by CMM 612. CMM 612 in turn, dispatches the indications to the appropriate DCM, as shown by lines 615. In accordance with the present embodiment, CMM 612 only dispatches to the DCM level, and each DCM is responsible for dispatching the indication to the right FCM that belongs to it. Indications going to an FCM are routed through its DCM. There are at least two reasons to use such a hierarchy structure. First, a particular DCM knows better than CMM 612 with regard to the dispatching of its respective FCM. Second, this reduces the processing burden on CMM 612.

In accordance with the present embodiment, there are at least two ways a DCM can dispatch an indication to its FCMs. One way is to base on the address information for the FCM in the command packet, for example, the sub-unit and sub-unit ID fields of FCP/AVC command packet. Another way is for a DCM to check which FCM is waiting for a return indication (e.g., by checking the status of a flag, etc.). The two schemes are combined to form one reliable dispatching mechanism.

The dispatching function of the present invention at the CMM level is somewhat more complex. In accordance with the present invention, as is well known, each IEEE 1394 packet has a 48 bit offset field which specifies the remote memory address the associated data will be written to or read from. An IEEE 1394 device driver processes only those indications that fall into the CSR (Control and Status Register) register scope and passes the rest up to CMM 612. By allowing each component to specify the offset range for which it is willing to process the indication, multiple indication handlers can be installed in the CMM 612. Each message handler, therefore, corresponds to one DCM and to one address range.

It should be noted that some offset ranges have been reserved, such as, for example, 0xFFFFF0000B00–0xFFFFF0000F00 for AVC commands, and 0xFFFFF0000900–0xFFFFF00009FF for connection PCRs. A component that wishes to process an AVC command or connection command indication may specify the offset range as above. If there is no overlap among all the ranges specified, CMM 612 can determine the proper handler based on the offset field of the incoming packet alone. However, for a node that owns multiple DCMs, more than one of them may specify the same offset range. Since there is only one DCM for each device and since the DCM only expects indications from the device it represents, by checking the originator of the indication, CMM 612 can identify the right DCM from multiple DCMs that specify the same range if the originator's GUID (Global Unique ID for a 1394 device) is used.

As another option, a BAV device is able to send control commands to a FAV or IAV device, where the self-DCM 607 of the FAV (or IAV) node is be able to receive indications from the remote sites. In other words, when CMM 612 receives an indication from a BAV device (or LAV device), it has to decide if this is for the BAV/LAV DCM (e.g., DCM 608) or for the self-DCM 607. By further analysis, it is found that a BAV/LAV DCM will not expect any indication from its corresponding device unless it has sent out a control command and prepared itself to receive a response from the physical device. When a DCM is in this situation, the corresponding BAV/LAV device is being controlled by the FAV node. And a BAV/LAV device is not expected to send control command to the FAV node while it is preparing a response for the command received from the FAV. Therefore, if a DCM is waiting for an indication from its physical target device, CMM 612 should dispatch such indication to this DCM. Otherwise, it should dispatch the indication to the self-DCM 607.

With reference now to FIG. 7, a flow chart of a process 700 in accordance with one embodiment of the present invention shown. Process 700 depicts the steps involved in a dispatching process implemented within an FAV node (e.g. set-top-box 301) hosting multiple DCMs and FCMs for a HAVI network (e.g., network 10a of FIG. 1).

Process 700 begins in step 701, where internal DCMs hosted by an FAV node (e.g., DCMs 607–609) each provide a header with a memory offset range and a target GUID (global unique identifier). DCMs that need to receive indications enroll themselves to the CMM hosted on the FAV node with a GUID. In step 702, the CMM (e.g., CMM 612 of FIG. 6) receives a request from an internal component (e.g., one of the internal DCMs 607–609) hosted on an FAV or IAV device (e.g., FAV 301 of FIG. 2). In step 703, the request is transmitted to the HAVI network via a network bus connection (e.g., an IEEE 1394 mbus connection). In step 704, CMM 612 receives an indication from a device coupled to the network in response to the request. In step 705, CMM 612 checks the offset field of the incoming packet, or packets, of the indication to match the scope of the available handlers for the DCMs. An appropriate handler is invoked by CMM 612 to process the indication in accordance with the needs of that handler's particular DCM.

Figure 7A:
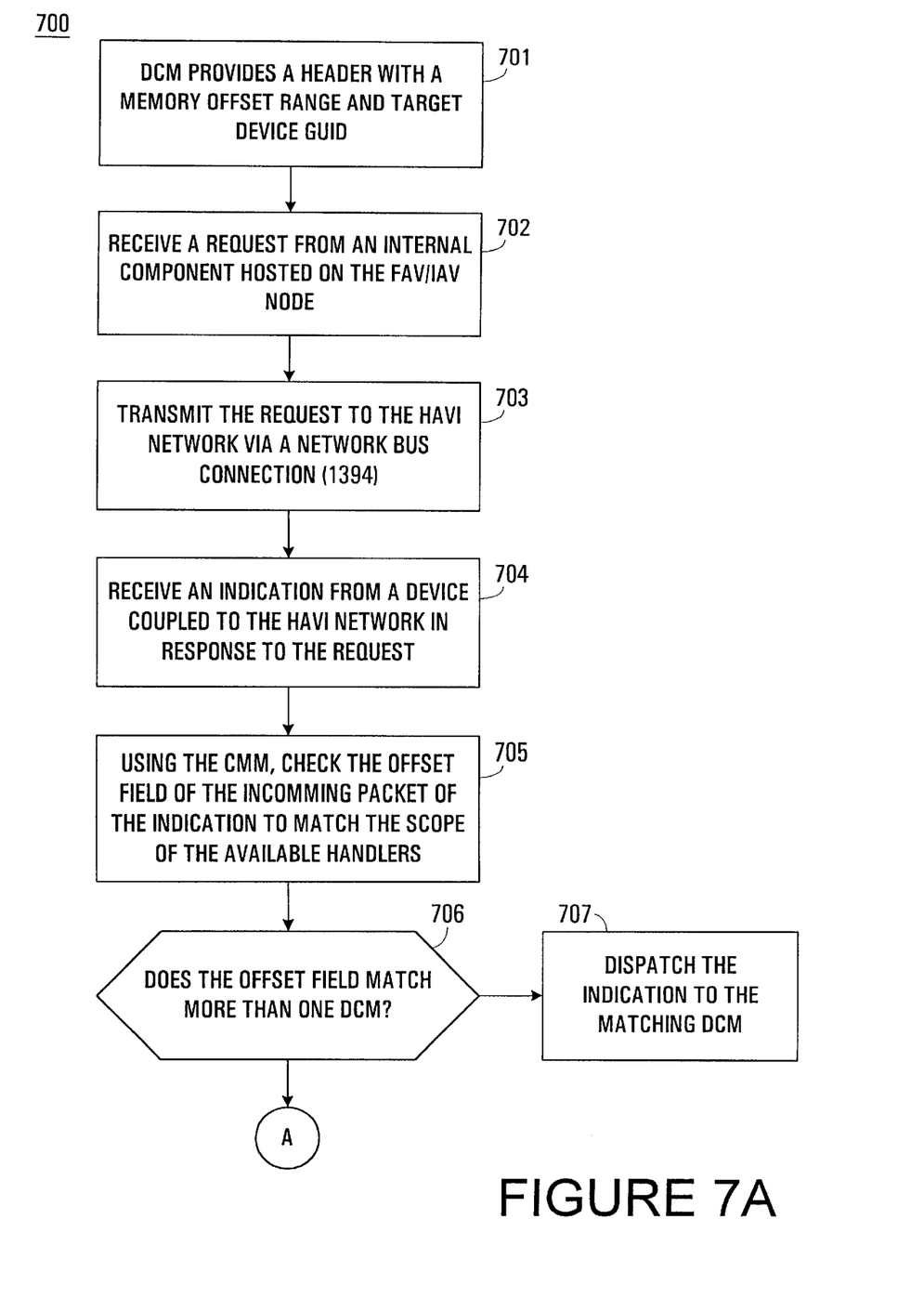
FIG. 7A shows a first portion of a flow chart of the steps of a process in accordance with one embodiment of the present invention.

Referring still to FIG. 7A, in step 706, CMM 612 determines whether the offset field matches more than one DCM. Where the offset field matches only one DCM, process 700 proceeds to step 707 where the indication is dispatched to the matching DCM. Where the offset field matches more than one DCM, process 700 proceeds to step 708 of FIG. 7B.

Figure 7B:
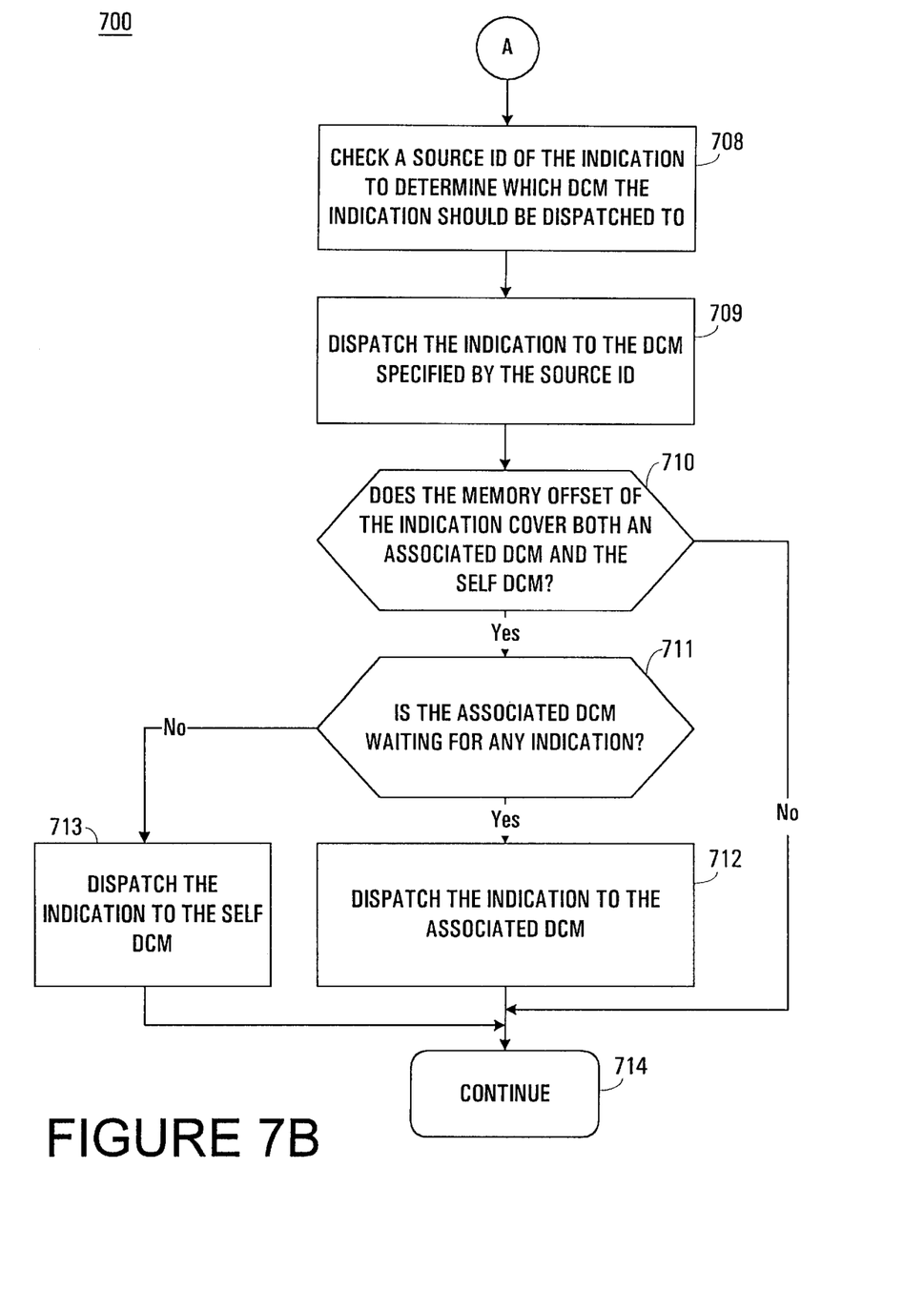
FIG. 7B shows a second portion of the flow chart of the steps of a process in accordance with one embodiment of the present invention.

Referring now to FIG. 7B, the remaining steps of process 700 (steps 707–713) are shown. In step 707, a source ID of the indication is checked to determine which DCM the indication should be dispatched to. Hence, in step 709, the indication is dispatched to the DCM specified by the source ID. In step 710, the memory offset of the indication is checked to determine whether the indication covers both an associated DCM and the self DCM. If both are covered, process 700 proceeds to step 711. Otherwise, process 700 proceeds to step 714 to, for example, await the next request or indication. In step 711, the associated DCM is checked to determine whether it is waiting for any return indication resulting from a request it generated. If the associated DCM is waiting for a return indication, process 700 proceeds to step 712, where the indication is dispatched to the associated DCM. Otherwise, in step 713, the indication is dispatched to the self DCM. Subsequently, in step 714, having ensured the indication is routed to the correct DCM, process 700 continues, for example, by returning to step 702 to await the arrival of another request or indication.

Figure 8:
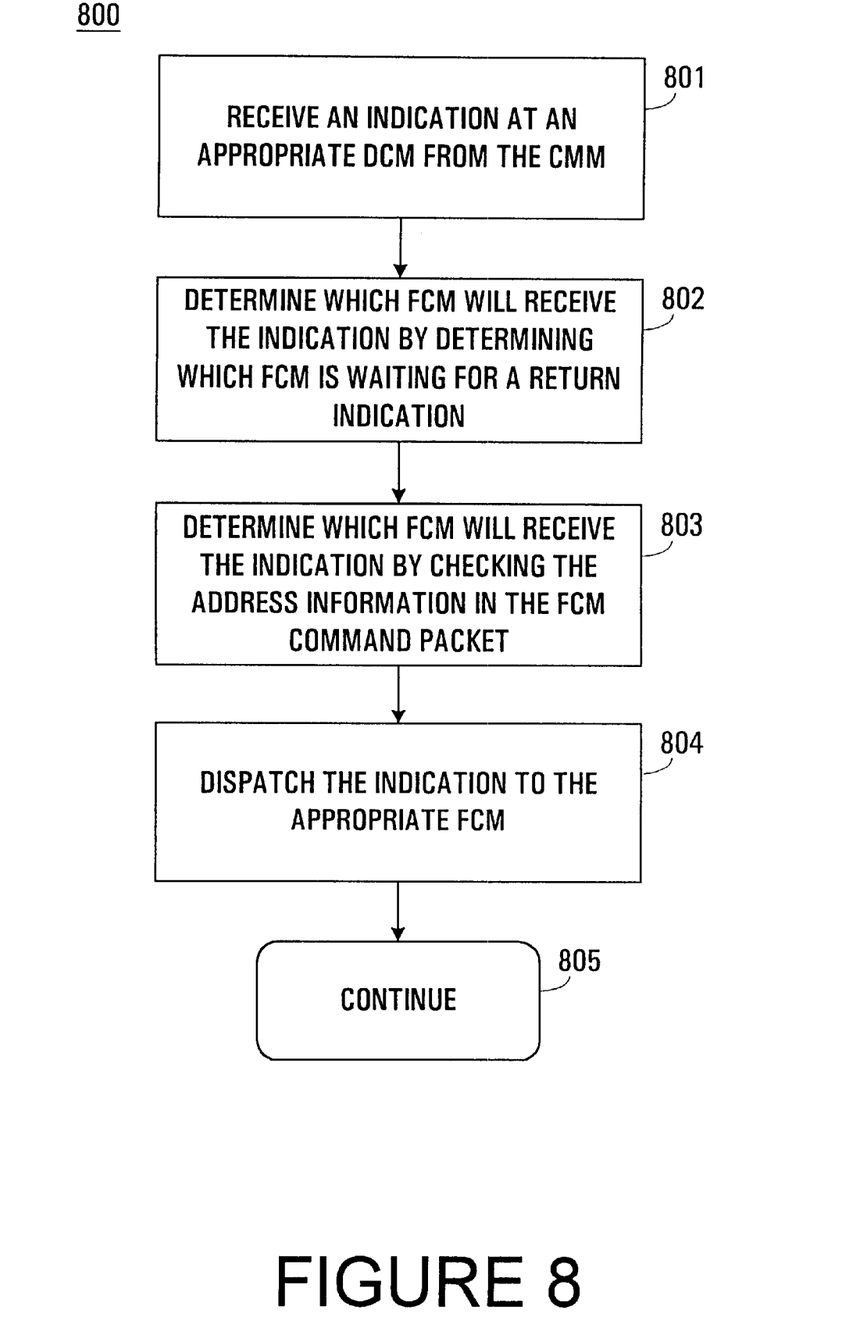
FIG. 8 shows a flow chart of the steps of a process for dispatching indications among FCMs included within a DCM in accordance with one embodiment of the present invention.

FIG. 8 shows a flow chart of the steps of a dispatching process 800 used for dispathing indications to the various FCMs once the indications are received by the appropriate DCM. Process 800 shows the process of dispatching an indication to the one or more FCMs, that comprise each DCM, after that indication is received at the DCM.

Process 800 begins in step 801, where after the steps of process 700 of FIGS. 7A and 7B, a DCM (e.g., one of DCMs 607–609) receives an indication from the CMM 612. In step 802, the DCM determines which FCM will receive the indication by first determining which FCM is awaiting a return indication from a previous request. In step 803, the DCM determines which FCM will receive the indication by checking the address information included in the FCM command packet of the indication and matching it with that of the FCM. As described above, the methods of step 802 and step 803 are combined to provide a more robust, reliable form of dispatching indications at the DCM to FCM level. In step 804, once the proper destination has been determined, the indication is dispatched to the appropriate FCM for processing as required. As with process 700, process 800 then continues, in step 805, for example, by returning to step 801 where the DCM awaits the arrival of another indication from CMM 612.

Thus, the present invention provides a novel method and system that implements a standardized, intelligent, self configuring, easily extensible architecture operable to ensure the efficient transmission and reception of data messages between various components/devices of a home audio/video network. The present invention provides a standardized architecture for ensuring reliable, efficient communication between the various software and hardware components within the home audio/video network, and ensures the seamless transmission and reception of data messages between software/hardware components. In addition, the present invention ensures the seamless transmission and reception of data messages in implementations where the various software components may be distributed among different hardware platforms coupled to the home audio/video network.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the Claims appended hereto and their equivalents.

What is claimed is:

1. In a home audio/video network of connected network devices, a method of routing a received message to a proper software controller, said method comprising the steps of:

a) receiving said received message from a network bus, said step a) performed by an intelligent device coupled to said network bus wherein said intelligent device comprises a memory having stored therein a plurality of software controllers for communicating with a plurality of network devices;

b) examining said received message to determine a memory space indication and a source device identification stored therein;

c) determining any software controllers that match said memory space indication;

d) provided only one software controller matches said memory space indication, dispatching said received message to said one software controller; and e) provided more than one software controllers match said memory space, dispatching said received message to that software controller that is also associated with said source device identification of said received message.

2. A method as described in claim 1 wherein said intelligent device further comprises a self-software controller defined to control said intelligent device and further comprising the step of f) provided said memory space indication matches said self-software controller and another software controller, dispatching said received message to said another software controller provided said another software controller is awaiting a return message, otherwise dispatching said received message to said self-software controller.

3. A method as described in claim 1 wherein said network bus is compliant with the IEEE 1394 communication standard.

4. A method as described in claim 3 wherein said received message is a message packet and wherein said memory space indication is a multi-bit offset field of said message packet that specifies a remote memory address associated with said message packet.

5. A method as described in claim 1 further comprising the step of registering, within said memory, a memory space allocation associated with each software controller of said plurality of software controllers of said intelligent device and establishing a handler for each software controller.

6. A method as described in claim 5 further comprising the step of registering, within said memory, a network device identification associated with each software controller of said plurality of software controllers.

7. A method as described in claim 6 wherein said network device identification is a global unique identification (GUID) of an associated network device.

8. A method as described in claim 1 wherein said received message is dispatched to a first software controller and wherein said first software controller comprises a plurality of sub-software controllers and wherein said step d) and step e) comprise the step of dispatching said received message to that sub-software controller of said plurality of sub-software controllers that is waiting for a received message.

9. In a home audio/video network, an intelligent device coupled to said network and having a processor coupled to a memory unit having instructions stored therein that implement a method of routing a received message to a proper software controller, said method comprising the steps of:

a) receiving said received message from a network bus wherein said memory unit also has stored therein a plurality of software controllers for communicating with a plurality of network devices;

b) examining said received message to determine a memory space indication and a source device identification stored therein;

c) determining any software controllers that match said memory space indication;

d) provided only one software controller matches said memory space indication, dispatching said received message to said one software controller; and e) provided more than one software controllers match said memory space, dispatching said received message to that software controller that is also associated with said source device identification of said received message.

10. An intelligent device as described in claim 9 wherein said intelligent device further comprises a self-software controller defined to control said intelligent device and further comprising the step of f) provided said memory space indication matches said self-software controller and another software controller, dispatching said received message to said another software controller provided said another software controller is awaiting a return message, otherwise dispatching said received message to said self-software controller.

11. An intelligent device as described in claim 9 wherein said network bus is compliant with the IEEE 1394 communication standard.

12. An intelligent device as described in claim 11 wherein said received message is a message packet and wherein said memory space indication is a multi-bit offset field of said message packet that specifies a remote memory address associated with said message packet.

13. An intelligent device as described in claim 9 further comprising the step of registering, within said memory, a memory space allocation associated with each software controller of said plurality of software controllers of said intelligent device and establishing a handler for each software controller.

14. An intelligent device as described in claim 13 further comprising the step of registering, within said memory, a network device identification associated with each software controller of said plurality of software controllers.

15. An intelligent device as described in claim 14 wherein said network device identification is a global unique identification (GUID) of an associated network device.

16. An intelligent device as described in claim 9 wherein said received message is dispatched to a first software controller and wherein said first software controller comprises a plurality of sub-software controllers and wherein said step d) and step e) comprise the step of dispatching said received message to that sub-software controller of said plurality of sub-software controllers that is waiting for a received message.

17. In a home audio/video network of connected network devices, a system for routing a received message to a proper software controller, said system comprising:

a) means for receiving said received message from a network bus, said receiving means including an intelligent device coupled to said network bus wherein said intelligent device comprises a memory means having stored therein a plurality of software controllers for communicating with a plurality of network devices;

b) means for examining said received message to determine a memory space indication and a source device identification stored therein;

c) means for determining whether any software controllers match said memory space indication;

d) provided only one software controller matches said memory space indication, means for dispatching said received message to said one software controller; and e) provided more than one software controllers match said memory space, means for dispatching said received message to that software controller that is also associated with said source device identification of said received message.

18. A system as described in claim 17 wherein said means for receiving said received message further comprises:

a self-software controller means defined to control said intelligent device, wherein said memory space indication matches said self-software controller means and another software controller means; and said received message dispatched to said another software controller means provided said another software controller means is awaiting a return message, said received message otherwise dispatched to said self-software controller means.

19. A system as described in claim 17 wherein said network bus is compliant with the IEEE 1394 communication standard.

20. A system as described in claim 19 wherein said received message is a message packet and wherein said memory space indication is a multi-bit offset field of said message packet that specifies a remote memory address associated with said message packet.

21. A system as described in claim 17 wherein a memory space allocation associated with each software controller means of said plurality of software controller means of said intelligent device is registered within said memory and wherein a handler is established for each software controller means.

22. A system as described in claim 21 wherein a network device identification associated with each software controller means of said plurality of software controller means is registered within said memory.

23. A system as described in claim 22 wherein said network device identification is a global unique identification (GUID) of an associated network device.

24. A system as described in claim 17 wherein said received message is dispatched to a first software controller means, said first software controller means comprising a plurality of sub-software controller means, said received message dispatched to that sub-software controller that is waiting for a received message.

* * * * *